US007971060B2

(12) United States Patent
Shah et al.

(10) Patent No.: US 7,971,060 B2
(45) Date of Patent: Jun. 28, 2011

(54) SYSTEM AND METHOD FOR ADD-ON SERVICES, SECONDARY AUTHENTICATION, AUTHORIZATION AND/OR SECURE COMMUNICATION FOR DIALOG BASED PROTOCOLS AND SYSTEMS

(75) Inventors: Milan Shah, Issaquah, WA (US); Khaled W. Hassounah, Boston, MA (US)

(73) Assignee: Symantec Corporation, Mountain View, CA (US)

( * ) Notice: Subject to any disclaimer, the term of this patent is extended or adjusted under 35 U.S.C. 154(b) by 739 days.

(21) Appl. No.: 11/861,283

(22) Filed: Sep. 26, 2007

(65) Prior Publication Data
US 2008/0072044 A1 Mar. 20, 2008

Related U.S. Application Data

(62) Division of application No. 10/288,548, filed on Nov. 6, 2002, now Pat. No. 7,475,240.

(51) Int. Cl.
*H04L 9/32* (2006.01)
(52) U.S. Cl. ............ 713/168; 713/155; 705/44; 705/67; 709/277
(58) Field of Classification Search .................. 713/155, 713/168; 705/44, 67, 79; 709/227, 277
See application file for complete search history.

(56) References Cited

U.S. PATENT DOCUMENTS

| 5,742,763 | A | 4/1998 | Jones |
| 5,919,258 | A | 7/1999 | Kayashima et al. |
| 5,956,483 | A | 9/1999 | Grate et al. |
| 5,958,052 | A | 9/1999 | Bellovin et al. |
| 6,108,787 | A | 8/2000 | Anderson et al. |
| 6,163,844 | A | 12/2000 | Duncan et al. |
| 6,178,505 | B1 | 1/2001 | Schneider et al. |
| 6,212,548 | B1 | 4/2001 | DeSimone et al. |
| 6,212,561 | B1 | 4/2001 | Sitaraman et al. |
| 6,212,636 | B1 | 4/2001 | Boyle et al. |
| 6,226,752 | B1 | 5/2001 | Gupta et al. |
| 6,272,538 | B1 | 8/2001 | Holden et al. |
| 6,301,609 | B1 | 10/2001 | Aravamudan et al. |
| 6,415,318 | B1 | 7/2002 | Aggarwal et al. |
| 6,430,602 | B1 | 8/2002 | Kay et al. |
| 6,714,982 | B1 | 3/2004 | McDonough et al. |
| 6,775,782 | B1 | 8/2004 | Buros et al. |
| 6,957,334 | B1 | 10/2005 | Goldstein et al. |
| 6,970,849 | B1 | 11/2005 | DeMello et al. |
| 7,003,661 | B2 | 2/2006 | Beattie et al. |
| 7,032,007 | B2 | 4/2006 | Fellenstein et al. |
| 7,082,538 | B2 | 7/2006 | Bouchard et al. |

(Continued)

FOREIGN PATENT DOCUMENTS

EP 1104964 A1 6/2001

(Continued)

OTHER PUBLICATIONS

European Examination Report, European Application No. 03 811 190.2, Oct. 8, 2009, 5 pages.

(Continued)

*Primary Examiner* — Thanhnga B Truong
(74) *Attorney, Agent, or Firm* — Fenwick & West LLP

(57) ABSTRACT

The present invention relates generally to a system and method that provides add-on services and/or facilitates authentication, authorization and/or secure communications of a user using a dialog based interactive protocol and accessing a first computer system, separately from the authentication and security mechanism(s) provided by a second computer system using a dialog based interactive protocol system.

18 Claims, 6 Drawing Sheets

U.S. PATENT DOCUMENTS

| | | |
|---|---|---|
| 2001/0003202 A1 | 6/2001 | Mache et al. |
| 2001/0042126 A1 | 11/2001 | Wong et al. |
| 2002/0007398 A1 | 1/2002 | Mendiola et al. |
| 2002/0103917 A1 | 8/2002 | Kay et al. |
| 2002/0184496 A1 | 12/2002 | Mitchell et al. |
| 2003/0018726 A1 | 1/2003 | Low et al. |
| 2003/0126213 A1 | 7/2003 | Betzler |
| 2004/0024909 A1 | 2/2004 | Yumoto et al. |

FOREIGN PATENT DOCUMENTS

| | | |
|---|---|---|
| WO | WO 01/54377 A2 | 7/2001 |

OTHER PUBLICATIONS

"America Online and Verizon Wireless Launch AOL Instant Messenger Service," Sep. 25, 2002, [online] [Retrieved on Nov. 6, 2002] Retrieved from the Internet<URL: http://biz.yahoo.com/bw/020925/252188_1.html>.

Cover, R., "Common Profile for Instant Messaging (CPIM)," The XML Cover Pages, Apr. 28, 2001, [online] [Retrieved on Jun. 10, 2002] Retrieved from the Internet<URL:http://xml.coverpages.org/cpim.html>.

Day, M. et al., A Model for Presence and Instant Messaging, RFC 2778, Feb. 2000, pp. 1-17.

Dierks, T. et al., "The TLS Protocol," RFC 2246, Jan. 1999, pp. 1-80.

George, T., "Instant Messaging: Going Corporate," InformationWeek.com, Aug. 6, 2001, [online] [Retrieved on Jun. 7, 2002] Retrieved from the Internet<URL: http://www.informationweek.com/story.IWK20010802S0002>.

Giacometti, S. et al., "Tunnelling Effectiveness in the Access Environment," IP Technology, pp. 101-105.

Hu, J., "AOL Gets Ready to Chat with IBM's Lotus," CNETNews.com, Aug. 14, 2001, [online] [Retrieved on Nov. 6, 2002] Retrieved from the Internet<URL:http://www.news.com.com/2100-1023-271619.html?legacy=cnet&tag=pt.msnbc.feed..ne_6874533>.

Hu, J., "AOL to Detail IM Plans," CNET News.com, Jul. 23, 2001, [online] [Retrieved on Jun. 7, 2002]. Retrieved from the Internet<URL:http://news.com.com/2100-1023-270345.html?legacy=cnet&tag=tp_pr>.

"IMlogic Instant Messaging Archiving Technology to Benefit Microsoft's Next-Generation Real Time Communications Solutions," IMLogic.com, Feb. 25, 2002, [online] [Retrieved on Nov. 6, 2002] Retrieved from the Internet<URL:http://www.imlogic.om/press2.html>.

"Imlogic Launches IMlog 2000, World's First Comprehensive Archiving Solution for Exchange 2000 Instant Messaging Server," IMlogic.com, Jul. 30, 2001, [online] [Retrieved on Jun. 7, 2002] Retrieved from the Internet<URL:imlogic.com/press4.html>.

Jainschigg, B. M. et al., "Computer Telephony," Communications Convergence.com, Jan. 5, 2001, [online] [Retrieved Jun. 10, 2002] Retrieved from the Internet<URL: http://www.convergence.com/article/CTM20001221S0013>.

Jones, J., "AOL Time Warner Deliver IM Interoperability Update," InfoWorld, Jul. 23, 2001, [online] [Retrieved on Jun. 7, 2002] Retrieved from the Internet<URL: http://staging.infoworld.com/articles/hn/xml/01/07/23/10723hnaolmessanger.xml?templat...>.

Jones, S.R. et al., "Collaboration Across the Coalition/US Only Security Boundary in the Advanced Process and Technology Experiment (APTX) 01," The MITRE Corporation, Aug. 6, 2002, 12 pages.

"MIT Project Athena," Massachusetts Institute of Technology, Jul. 1, 1988, ID: zephyr.1, v. 1.12, 21 pages.

Oettinger, R., "Total time Spent Using Instant Messaging Jumps 110 Percent at Percent Home Versus Last Year, Reports Jupiter Media Metrix," Jupiter Media Metrix, Nov. 14, 2001, [online] [Retrieved on Jun. 7, 2002] Retrieved from the Internet<URL:http://www.jmm.com/xp.jmm/press/2001/pr_111401.xml>.

"Open IM Architecture Design," AOL.COM, Jun. 10, 2002, [online] [Retrieved Jun. 10, 2002] Retrieved from the Internet<URL:http://aim.aol.com/openim/>.

PCT International Search Report, PCT/US03/21354, Dec. 18, 2003, 6 pages.

Poe, R., "Instant Messaging Goes to Work," Business 2.0, Jul. 2001 Issue, [online] [Retrieved Nov. 6, 2002] Retrieved from the Internet<URL:http://www.business2.com/articles/mag/0,1640,14845/2,FF.html>.

"Protecting the Enterprise from Rogue Protocols," Akonix Systems, Inc., 2002, 10 pages.

Ramsdell, J.D., "Simple Instant Messaging and Presence 1.4 Protocol," The MITRE Corporation, May 2002, pp. 1-19.

Vaas, L., "IM Genie Out of the Bottle," eWeek, Dec. 3, 2001, [online] [Retrieved Nov. 6, 2002] Retrieved from the Internet<URL:http://www.eweek.com/print_article/0,3668,a=19359,00.asp>.

"Zantaz and Imlogic Offer Instant Messaging Archiving Solution to Meet Regulatory Compliance Challenges of Financial Services Companies," IMlogic.com, Oct. 17, 2001, [online] [Retrieved on Nov. 6, 2002] Retrieved from the Internet<URL:http://www.imlogic.com/press3.htm>.

Giacometti, S. et al., "Tunnelling Effectiveness in the Access Environment," IP Technology, pp. 101-105, Aug. 24, 1999.

SYSTEM AND METHOD FOR ADD-ON SERVICES, SECONDARY AUTHENTICATION, AUTHORIZATION AND/OR SECURE COMMUNICATION FOR DIALOG BASED PROTOCOLS AND SYSTEMS

CROSS REFERENCE TO RELATED APPLICATIONS

This application is a division of U.S. application Ser. No. 10/288,548, filed Nov. 6, 2002, now U.S. Pat. No. 7,475,240 which is incorporated by reference in its entirety.

BACKGROUND

The present invention relates generally to a system and method for providing add-on services and/or secure communication for systems using a dialog based interactive protocol (e.g., Instant Messaging) and, more particularly, to a system and method that provides add-on services and/or facilitates authentication, authorization and/or secure communications of a user accessing a first computer system, separately from the authentication and security mechanism(s) provided by a second computer system using a dialog based interactive protocol system.

Several dialog based interactive protocols and systems have witnessed rising popularity in applications such as Instant Messaging (IM). Such protocols and systems typically include some mechanism for authentication of the users using the system, but typically lack a mechanism for securing the dialog between users.

For example, an America Online Corporation (AOL) Instant Messenger (AIM) session begins with a sign on process that uses a user's AOL screen name and a password encrypted using MD5. AIM messages are not, however, encrypted.

MSN Messenger user passwords are encrypted using a conventional MD5 hash algorithm. However, all messages other than the authentication sequence are in clear text.

Popular IM systems such as AOL, MSN, and Yahoo! Messenger are primarily designed for the consumer space where ease of use and minimal configuration are primary design goals. These design goals limit the amount of security that can be built into the IM protocol. For example, the use of public-key techniques for authentication is limited by the difficulty of reliably distributing and configuring a public-key certificate to each client.

For a variety of reasons including, for example, the need to ensure a sufficient level of security, scalability, and availability, each of the above-identified systems are closed. That is, the only access to them is via client software provided by the system operator.

Conventional instant messaging systems typically lack add-on services such as the ability to, for example, save/record a dialog onto a storage medium (e.g., into a database), scan incoming dialog messages for viruses, and/or apply, for example, natural language recognition techniques to monitor the dialog for inappropriate material.

SUMMARY

In one exemplary use of the present invention, at least one embodiment uses a first computer system that provides a desired service, and a second computer system, such as America Online Corporation (AOL) Instant Messaging Service (AIM), provides at least a dialog based interactive protocol service.

A system and method is provided that provides and/or facilitates protocol translations/conversions, authentication and/or secure communications with a user accessing the first computer system, separately from the authentication and security mechanism(s) provided by the second computer system. Further, at least one embodiment of the present invention provides a system and method whereby users of a second system that utilizes one or more dialog based interactive protocols (e.g., AIM) can interact with a first computer system and/or personnel associated therewith to, for example, participate, initiate and/or conclude an automated process, and/or to, for example, obtain or disseminate information pertaining to an item and/or process of interest.

In addition, at least one aspect of the present invention provides a system and method for secondary authentication of users by the first computer system, and optionally provides secure communication for use by the entity owning the first computer system(s) with which user interaction is desired. Advantageously, changes are not required to or by the entity that owns and controls the second computer system using the dialog based interactive protocol system. In particular, at least one embodiment of the present invention enables a first entity (e.g., one or more users and/or computers of a first organization) that owns and controls the computer system(s) with which user interaction is desired to communicate with and/or be utilized by one or more users of a second system that enables users of the second system to utilize one or more deployed dialog based interactive protocol systems which are not owned, controlled, or trusted by the first organization.

In addition, at least one exemplary embodiment of the present invention uses a dialog based interactive protocol system (e.g., AIM) to communicate to a user of the second system, for example, a pointer (e.g., a link) to the first system. The first system can advantageously operate independently of the second system that owns and operates the dialog based interactive protocol system.

Further, users of the second system are able to dereference the pointer, and authenticate themselves with the (separate) first system. One aspect of the invention further keeps an association of the authentication information with the session used by the user for the dialog based interactive communication. By maintaining the association between the first system authentication information and the session used for dialog, a user initially using the second system can now advantageously utilize, for example, the first system using one or more dialog based interactive protocols for communications with the first system. In addition, since the user has been authenticated by the first system, controlled and/or secure information can be disseminated to the user. Users can generally communicate with the first system in accordance with the security procedures and/or protocols used by the first system.

In accordance with another embodiment of the present invention, a system and method is provided that provides a range of add-on services to conventional interactive based dialog protocol systems. For example, an exemplary embodiment of the present invention provides the ability to encrypt at least a portion of the dialog, record the dialog in a permanent store, and/or monitor (e.g., scan) at least a portion of the dialog for inappropriate content using, for example, natural language techniques. An exemplary embodiment of the add-on services aspect of the present invention comprises a software module that interfaces and/or communicates with, for example, the client software and a dialog based interactive protocol system (e.g., an IM system). The module preferably transparently (or substantially transparently so as to not substantially adversely affect other system functions) utilizes the Transmission Control Protocol (TCP) connection between an IM client and the server. The invention can, for example, intercept and relay the messages of the dialog, and can provide additional services. Insofar as the HyperText Transport Protocol (HTTP) also uses TCP as a transport layer, the present invention also contemplates intercepting IM messages over the HTTP.

In operation, clients of a dialog based interactive protocol create a conventional TCP connection over, for example, the Internet and to one or more servers that broker and/or implement the dialog based protocol. The dialog is then carried out over the TCP connection. The TCP connection also serves as a mechanism that allows the server(s) to deduce and "advertise" (communicate) the availability of people that currently have a connection that can be used to engage in a dialog. For example, an IM feature known as a "Buddy List" enables users to create, organize, and manage a list of online friends, family members, and co-workers on a PC and/or a mobile phone. A Buddy List feature window enables users to see which contacts (i.e., "Buddies") are offline or busy, and which are online and ready for messaging. The Buddy List thus enables users of the system to know which other users are available for a dialog.

To find a server to connect to, a client can utilize the Domain Name System (DNS) to identify and locate the TCP/Internet Protocol (TCP/IP) address of a server given the name of the server. Conventional DNS implementations generally access a local hosts file for name-to-address maps before using the configured DNS servers for resolving a name to its address.

The present invention may utilize a special IP address of 127.0.0.1, known as a loopback address, which points to the local computer. Thus, an attempt to make a connection to the address of 127.0.0.1 results in an attempt to make a connection to the computer that is initiating the connection itself (hence, a loopback connection).

This embodiment of the present invention adds an entry to the hosts file that maps or associates the name of a dialog based interactive protocol server maintained and operated by, for example, an Internet Service Provider to the IP loopback address (i.e., 127.0.0.1). It can be implemented as software that is installed (e.g., via a conventional download) on a client computer in a conventional manner. Once installed, the software monitors (or "listens on") ports that the protocol server(s) listen(s) on. When a dialog based interactive protocol (e.g., AIM) client attempts to connect to a dialog based interactive protocol server, the attempt to resolve the name of the server results in a mapping to the local computer because of the entry in the hosts file. Thus, the dialog based interactive protocol server establishes a TCP connection to, for example, the local computer (or wireless device), where an exemplary embodiment of the method in accordance with the present invention accepts the TCP connection. In response to an incoming connection, an exemplary embodiment of the present invention creates a connection to a server operated by the provider of the IM (or other) dialog based interactive protocol service.

Once an incoming connection from a client is accepted and a corresponding connection to an IM server is established, an exemplary embodiment of a method in accordance with the present invention relays the dialog protocol messages from one connection to the other. When the IM server connection is established, the present invention can also optionally provide additional services such as storing at least a portion of the dialog in a permanent store, encrypting at least a portion of the dialog (for subsequent decryption by, for example, another party to the dialog), and scanning at least a portion of the dialog for a virus and/or inappropriate content.

Before explaining at least some embodiments of the invention in detail, it is to be understood that the invention is not limited in its application to the details of construction and to the arrangements of the components set forth in the following description or illustrated in the drawings. The invention is capable of other embodiments and of being practiced and carried out in various ways.

BRIEF DESCRIPTION OF THE DRAWINGS

The Detailed Description including the description of a preferred structure as embodying features of the invention will be best understood when read in reference to the accompanying figures wherein.

DETAILED DESCRIPTION

Figure 1:
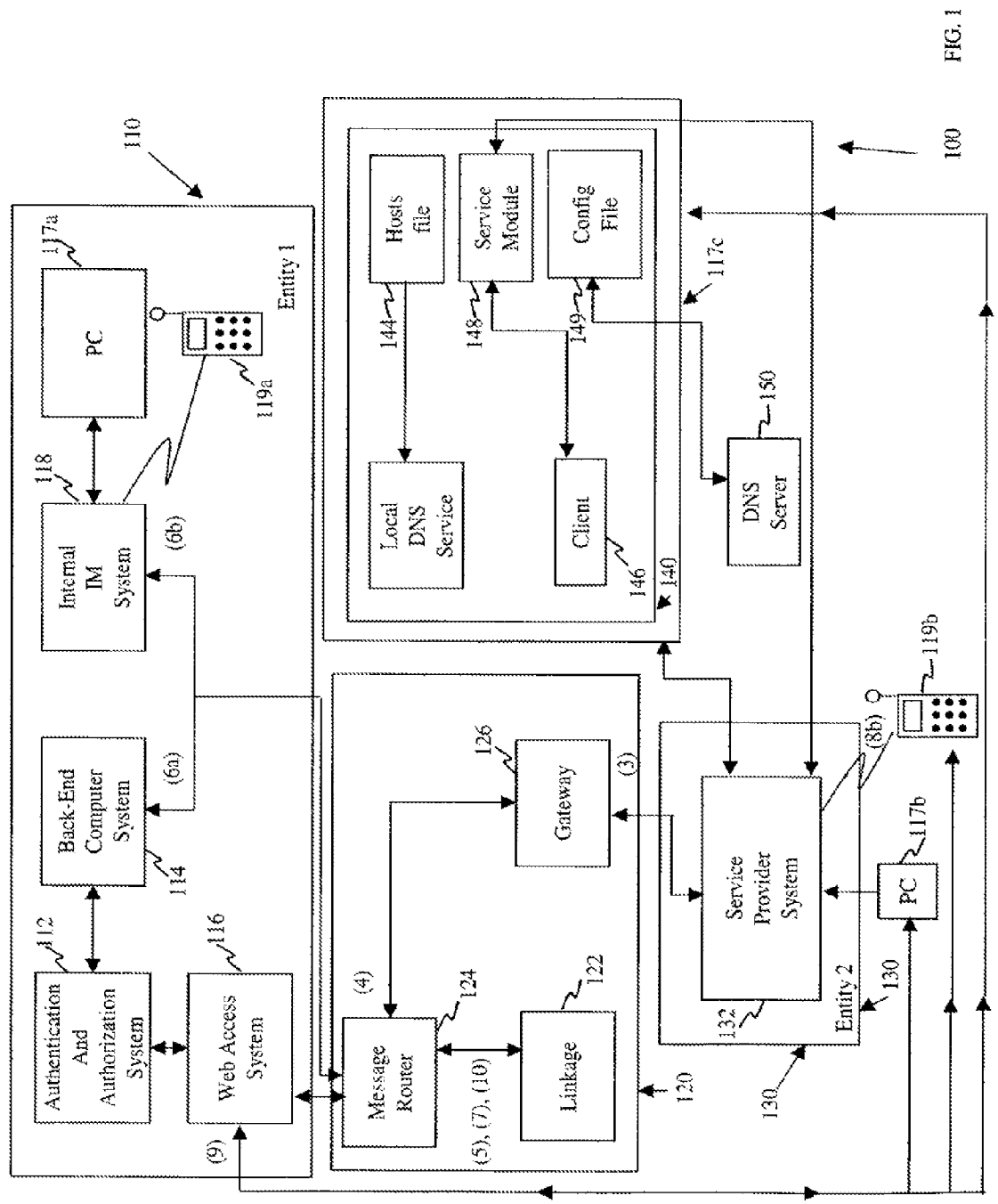
FIG. 1 is an exemplary representative simplified block diagram of a system of the present invention, which also illustrates an overview of the method according to the present invention.

FIG. 1 is an exemplary embodiment of a system 100 and architecture for practicing a preferred embodiment of the present invention. The system 100, which in the exemplary embodiment shown in FIG. 1 consists of entity 1 (110), linkage module 120, entity 2 (130), and add-on module 140, can utilize a conventional network infrastructure (not shown) that enables the use of Instant Messaging (IM) communication protocols that enable or facilitate the transmission and display of messages on communication devices such as conventional personal computers (PCs) 117a, 117b, 117c, and/or wireless devices 119a, 119b. Add-on module 140 can reside within PC 117c. Equivalent portions of add-on module can also reside on wireless devices 119a, 119b.

The system 100 enables a non-trusted user of a conventional PC 117b and/or wireless device 119b to authenticate, authorize and securely communicate with, for example, back-end computer system (BES) 114, IM system 118 and/or one or more users using devices such as a PC 117a and/or wireless device 119a utilizing a dialog based interactive protocol system (e.g., AOL Instant Messenger (AIM), Yahoo! Messenger, etc.) that is controlled and operated by non-trusted entity 2 (130) (e.g., service provider system 132). As used herein, entity 1 (110) and entity 2 (130) can represent companies, organizations, institutions, and the like. For example, entity 1 (110) can be a financial institution such as a bank, and entity 2 (130) can be an IM service provider (e.g., America Online Corporation, Microsoft Corporation, etc.). Further, service provider system 132 is a dialog based interactive system owned and operated by entity 2 (130), and is the system that can be used by the interactive user of PC 117b and/or wireless device 119b to have secure, authenticated, and authorized communications with entity 1 (110). Service provider system 132 maintains, for example, a database or directory, of presentities. An exemplary presentity is an electronic identity consisting of, for example, a name, a password, and a presence status. Presentities can be implemented by way of a data structure with individual fields for each of the respective name, password, and presence status elements. Further information pertaining to presentities is contained in the following Internet Engineering Task Force documents: 1) Request for Comment (RFC) 2778, dated February 2000, by M. Day et al., and entitled A Model for Presence and Instant Messaging, and 2) RFC 2779, dated February 2000, by M. Day et al., and entitled Instant Messaging/Presence Protocol Requirements. Copies of RFC 2778 and 2779 are incorporated herein by reference, and submitted herewith and attached as appendices.

The network infrastructure can consist of the Public Switched Telephone Network (PSTN), the Internet and/or a wireless network. Other network infrastructure can also be utilized. For example, the system 100 may also include a long distance network (LDN) operatively connected to the PSTN, and a terminating local PSTN operatively connected to the LDN. Embodiments of the invention also contemplate connection of one or more of entity 1 (110), linkage module 120, entity 2 (130) and/or add-on module 140 via, for example, one or more suitable network interfaces (not shown).

Wireless devices 119a, 119b preferably utilize, for example, any suitable second (or higher) generation (2G) network protocols and/or technologies to connect to service provider system 132. For example, 2G wireless networks/technologies such as Global System for Mobile Communications (GSM), Time Division Multiple Access (TDMA), Integrated Dispatch Enhanced Network (IDEN) and/or Code Division Multiple Access (CDMA) can be utilized. Similarly, 2.5 generation networks/protocols such as General Packet Radio Service (GPRS) and/or CDMA 1.times.Radio Transmission Technology (1.times.RTT) can be utilized, as can third generation (3G) networks/protocols such as CDMA2000, Enhanced Data for GSM Evolution (EDGE) and/or Universal Mobile Telecommunications System (UMTS).

Entity 1 (110) includes authentication and authorization system (AAS) 112 which, in some embodiments, can authenticate users accessing entity 1 (110) and can store authorization information. Web access system (WAS) 116 provides a secure way (using, for example, HyperText Transport Protocol Secure (HTTPS) and/or Wireless Transport Layer Security (WTLS) for users to access the AAS 112 over the World Wide Web (WWW)).

Back-end computer system (BCS) 114 is a system that is controlled by and/or operates in conjunction with entity 1 (110). PC 117b and/or wireless device 119b can communicate with entity 1 (110) to facilitate an interactive dialog using, for example, an IM protocol to, for example, participate in, initiate, and/or conclude an automated process, and/or to obtain and/or disseminate information. Internal IM system 118 is a dialog based interactive protocol system (e.g., AIM, MSN Messenger) that is controlled by and/or associated with entity 1 (110). IM system 118 can be used by personnel of entity 1 (110) to engage in interactive dialogs with users of entity 1 (110) and/or entity 2 (130).

Within linkage module 120, message router 124 routes messages between itself and the following: linkage 122, gateway 126, WAS 116, BCS 114, and Internal IM system 118. In at least one embodiment, message router 124, linkage 122 and gateway 126 can be servers with software having the functionality described herein. More specifically, in an exemplary embodiment gateway 126 includes one or more software modules that can accept logical commands. Exemplary logical commands can be in the form of a message and/or a conventional call to a particular software function. In response to a logical command, gateway 126 can emit one or more messages formatted according to the rules of a particular dialog based interactive protocol. Message router 124 and linkage 122 can be similarly configured.

In an exemplary embodiment, message router 124 includes one or more software modules that allow the separation of dialog processing (performed by linkage 122) and connection and protocol maintenance (performed by gateway 126). Any number of gateway 126 servers and linkage 122 servers may be deployed. The use of message router 124 and one or more linkage and gateway servers can improve the scalability of the messaging capabilities of system 100. Message router 124 routes logical messages between the various systems, such as by using a unique ID in each message. The unique ID in each message allows message router 124 to identify the correct linkage 122, gateway 126 server or back-end system 114 to which to route the message.

In order to transmit and receive protocol messages, at least one embodiment of gateway 126 maintains a conventional Transmission Control Protocol (TCP) network connection for each established dialog. A conventional TCP connection can be represented by a socket, which is the combination of the Internet Protocol (IP) address (e.g., 192.168.1.1) of the station and a port number (up to 65535). Insofar as HTTP also uses TCP as a transport layer, the present invention also contemplates intercepting IM messages over the HTTP.

The well-known port numbers are the port numbers that are reserved for assignment by the Internet Corporation for Assigned Names and Numbers (ICANN) for use by the application end points that communicate using the TCP or the User Datagram Protocol (UDP). Each kind of application has a designated (and thus "well-known") port number. For example, HTTP has the port number of 80. The Post Office Protocol Version 3 (POP3) application, commonly used for e-mail access, has the port number of 110. When one application communicates with another application at another host computer on the Internet, it specifies that application in each data transmission by using its port number. The well-known ports cover the range of possible port numbers from 0 through 1023. Other registered ports are numbered from 1024 through 49151. The remaining ports, referred to as dynamic ports or private ports, are numbered from 49152 through 65535. MSN Messenger uses port 1863, Yahoo uses port 5050, and AIM uses ports 5190 and 5191.

Figure 2:
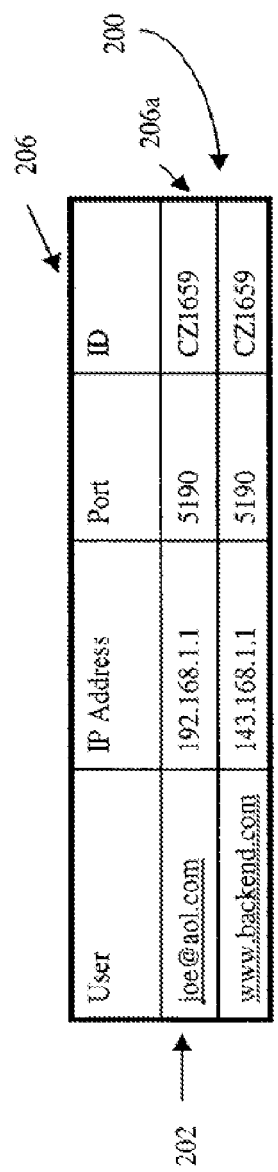
FIG. 2 is an exemplary embodiment of a data structure that can be used to associate a unique ID of a user dialog with a socket.

Gateway 126 maintains a data structure, called the context, representing the state of each connection, including the socket over which the dialog is being carried out. The context is preferably stored in random access memory (RAM) of gateway 126. An exemplary context between a first user 202 and a second user 204 is shown in FIG. 2, which also shows an exemplary embodiment of a data structure that can be used to associate a unique ID of a user dialog with a socket.

When gateway 126 receives a conventional invitation message (e.g., using the Send Chat Invitation icon, located on the AIM window below the Buddy List) to initiate or create a new dialog between two or more users, and/or when a logical request is made to gateway 126 to send an invitation, gateway 126 creates a unique ID 206 to represent the dialog or associates a unique ID with the dialog. Subsequently, any messages received belonging to the dialog are forwarded to message router 124 along with the unique ID. Similarly, any messages transmitted to gateway 126 from message router 124 with the unique ID are mapped to the context data structure and transmitted to the service provider system 132. Mapping from a unique ID to the context data structure can be done by, for example, a lookup table (e.g., a hash table).

Messages can be routed in a conventional manner based on, for example, fields in the message that indicate source and destination of the message. For purposes of scalability and/or redundancy, any of entity 1 (110), linkage module 120 and/or entity 2 (130) (or their respective components) can have multiple instances. Message router 124 selects the correct instance of the system and/or can perform load balancing across multiple instances, as appropriate.

Linkage 122 creates and maintains associations between a session of a user dialog, authentication information created when the user provides credentials to the WAS 116, and the authorized and trusted session with the BCS 114 and/or internal IM system 118. Gateway 126 interacts with a dialog based interactive protocol system owned and operated by a separate entity (e.g., entity 2 (130)) that is not trusted by entity 1 (110) for purposes of user authentication.

An exemplary embodiment of linkage 122 comprises one or more software modules. The functions of linkage 122 services can be invoked by, for example, transmitting conventional logical command messages to linkage 122. The services provided by linkage 122 are typically targeted at a particular dialog, as identified by the unique ID 206. A least one embodiment of linkage 122 maintains a data structure, known as the context, for each dialog that it is processing. For example, HTTP uses a context data structure HttpCtx to store the current state of a HTTP transaction.

Figure 3A:
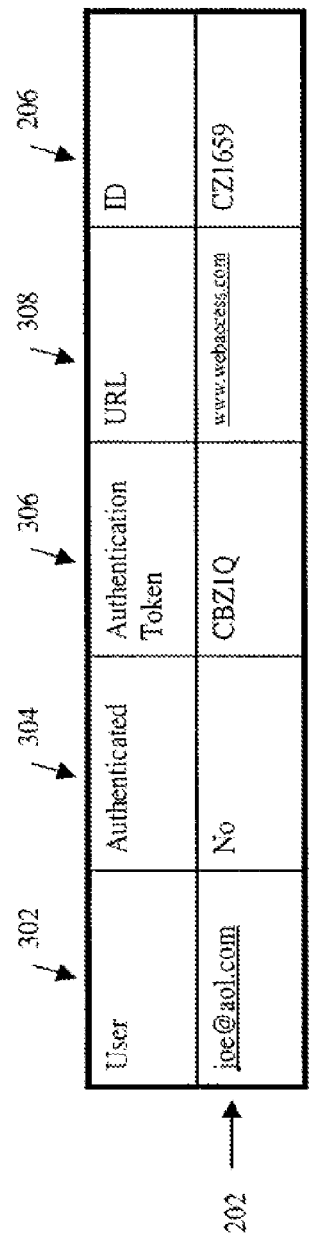
FIGS. 3A and 3B, taken together, is an exemplary embodiment of a data structure that can be used to associate authentication information with a unique identifier associated with a user dialog.
Figure 3B:
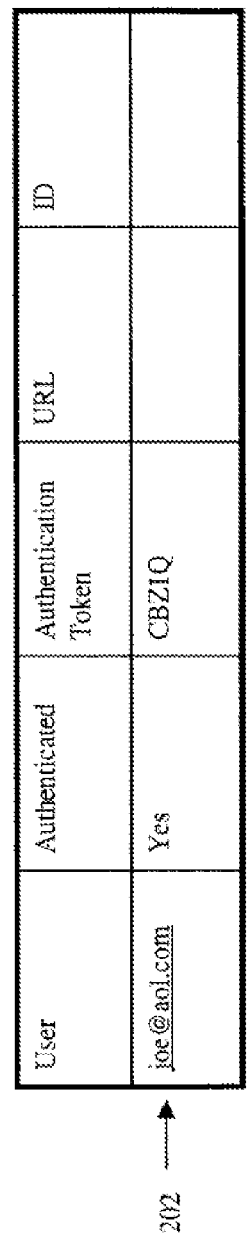

FIGS. 3A and 3B, taken together, show an exemplary data structure that can be used by linkage 122 to determine whether a user (e.g., user 202) has been authenticated. In FIG. 3A, user 202 has not been authenticated; in FIG. 3B, user 202 has been authenticated.

More particularly, in FIG. 3A, when the user authentication service is invoked, linkage 122 checks the context (of the dialog) 300 to determine if user 202 has been authenticated (as indicated by field 304). Since user 202 has not been authenticated (as indicated by "No" in column 304 of FIG. 3A), linkage 122 preferably transmits a logical command to gateway 126 via message router 124 to send a message to user 202 to activate (e.g., by clicking on), for example, a particular web Uniform Resource Locator (URL) 308. The URL also has associated with it the ID 206 that is associated with the dialog (from FIG. 2).

The web URL points or directs user 202 to WAS 116, and contains, as a parameter, the unique ID 206 associated with the dialog. Upon receiving the message, user 202 can activate the URL that directed user 202 to WAS 116 web page, where user 202 can identify him/herself by, for example, providing the name (e.g., a username) and credentials (e.g., a password). Since access to a web page can be completely secured via means such as HTTPS, credentials can be provided to web access system 116 in a secure manner. Upon verifying user 202 credentials, WAS 116 can transmit a message to linkage 122 via message router 124, providing both the unique ID 206 that was passed as a parameter in the URL 308, and a token 306 identifying the now authenticated user 202 (shown in FIG. 3B at 304). Upon receiving this message, linkage 122 uses the unique ID 206 to locate the context data structure 200, and maintains the provided authentication token 306, as shown in FIG. 3B.

Some dialog based interactive protocols allow for the transmission of richly formatted text, typically in the form of HyperText Markup Language (HTML) or MIME (Multipurpose Internet Mail Extensions) HyperText Markup Language (MHTML) formatted text. In another embodiment of the invention, linkage 122 can transmit a HTML or MHTML page (not shown) that can be displayed to the user 117b, 119b (e.g., directly in the display PC 117b and wireless device 119b, respectively). The user of the device 117b, 119b can then provide the user name and credentials directly in the transmitted display. The filled out form can then be transmitted to WAS 116.

Regardless of whether the user transmits credentials to or enters credentials at WAS 116, the WAS 116 can send a conventional cookie back to the user's web browser (of, for example, PC 117b) containing the unique ID of the dialog. For security reasons, the unique ID within the cookie is preferably encrypted.

Another service provided by linkage 122 is the ability to securely transmit a message to an authenticated user. To do so, linkage 122 transmits to user (via a logical command to gateway 126) 117b and/or 119b a message containing a URL to a secure system containing the sensitive data. The data is only shown if the browser is able to reproduce the cookie that was given to it as part of the authentication process.

Figure 4A:
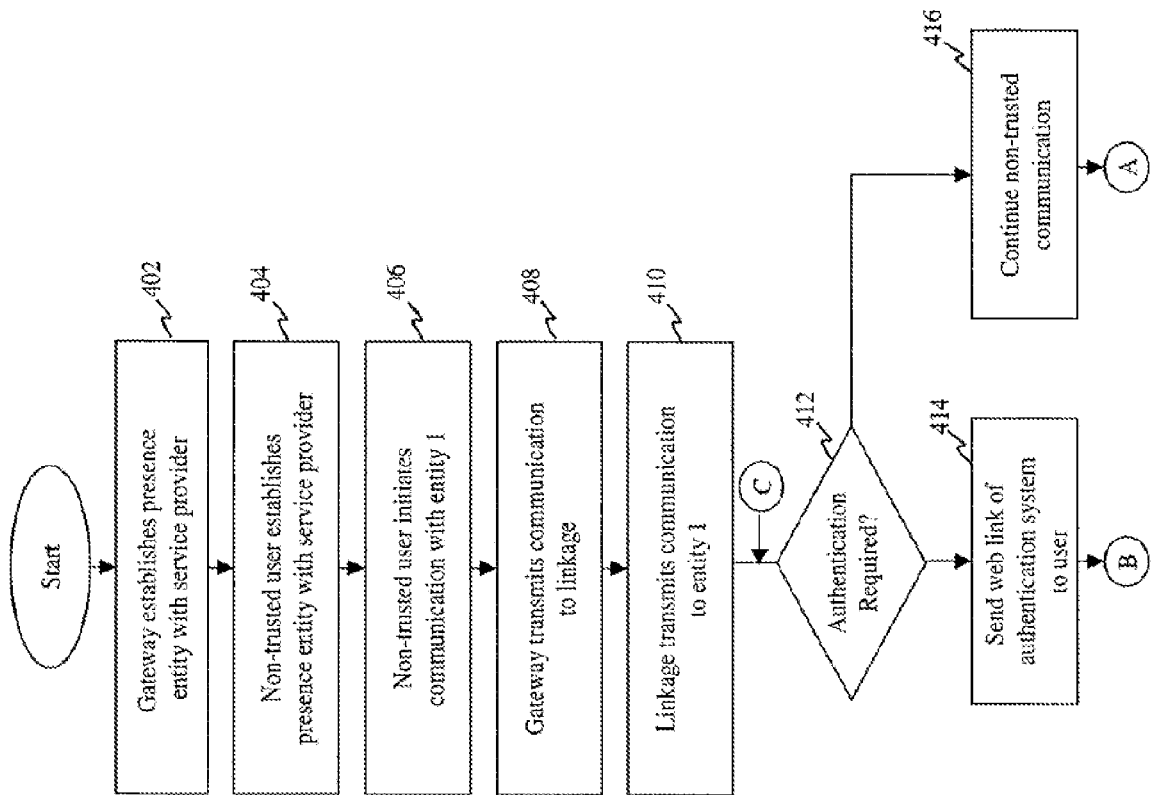
FIGS. 4A and 4B, taken together, is a flowchart of the operation of an embodiment of the authentication and authorization aspects of the present invention.
Figure 4B:
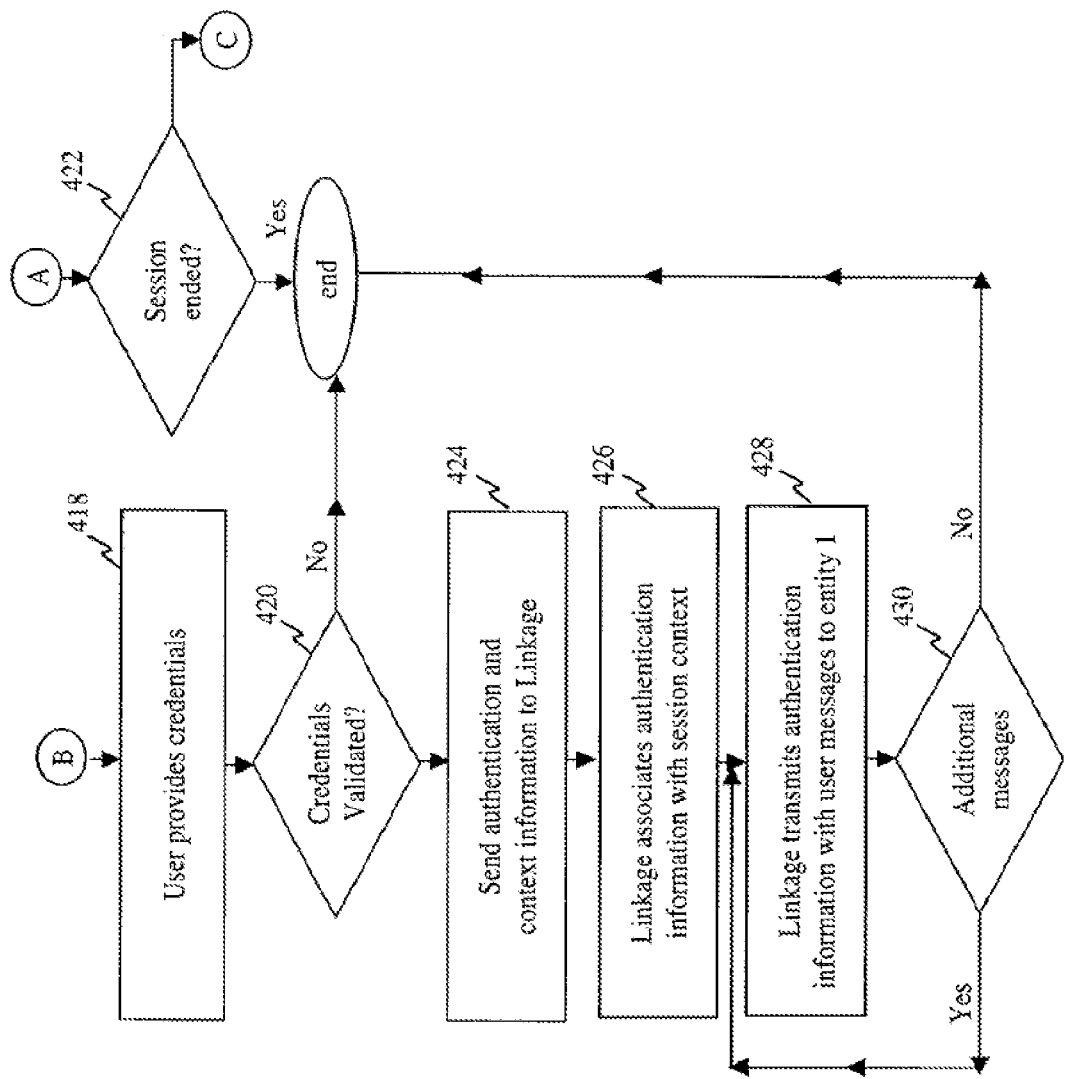

FIGS. 4A and 4B, taken together, is a flowchart of the operation of a preferred embodiment of the invention. With regard to FIGS. 4A and 4B, reference numerals corresponding to the flow of information in FIG. 1 are also provided in parentheses (e.g., (1)).

At step 402, gateway 126 initially establishes (1) a presentity (i.e., a presence entity that, for example, provides presence information to a presence service) with the service provider system 132 dialog based interactive system. A presentity is the entity whose presence information is tracked. A presentity preferably registers its status, location, and other attributes with the service provider system 132.

At step 404, an interactive user using, for example, a PC 117b and/or a wireless device 119b also establishes (2) a presentity with the service provider system 132 dialog based interactive system. At step 206, the user initiates (3) a communication with entity 1 (110), via the presentity established in step 402. At step 408, gateway 126 accepts the communication request and transmits (4) the communication to the message router 124 which, in turn, transmits (5) the message to linkage 122.

At step 410, linkage 122 examines the contents of the communication request and, if appropriate, optionally creates a new context (as discussed with regard to FIGS. 2 and 3) regarding, for example, the name and/or role or other properties or characteristics of the user making the request for the communication session. Linkage 122 may also optionally facilitate or provide, for example, communication without regard to the underlying protocol(s) and/or data format(s) used by entity 1 (110) and entity 2 (130). That is, gateway 126 and linkage 122 work together via message router 124 to facilitate communication regardless of the (same or different) IM protocol(s) being used by each of entity 1 (110) and entity 2 (130). Linkage will, as appropriate, transmit (6a, 6b) one or more messages to the BCS 114 or internal IM system 118 via message router 124.

At decision step 412 a determination is made whether entity 1 (110) wishes to authenticate the user of PC 117b and/or wireless device 119b. If it is determined at decision step 412 that authentication is required, a message is transmitted (7) to linkage 122 by BCS 114 or internal IM system using message router 124. At step 414, linkage 122 then transmits (8a, 8b) the Uniform Resource Locator (URL) of AAS 112 to the PC 117b and/or wireless device 119b, preferably using message router 124, gateway 126, and service provider system 132. The BCS 114 also preferably transmits instructions to access the transmitted URL and provide credentials. The URL also contains information about the context that was established for the session between the PC 117*b* or wireless device 119*b* and the respective back end computer system 114 or internal IM system 118.

At step 418, the user of PC 117*b* or wireless device 119*b* will then utilize the URL provided to access (9) WAS 116 and provide credentials. For securely communicating information to the interactive user, linkage can send a link to a secure Web site that contains the information, instead of sending the information directly over the interactive protocol session. Web access server 116 can use AAS 112 to validate user credentials, as discussed with regard to FIG. 1. If the user of PC 117*b* or wireless device 119*b* is authenticated then, at step 424, WAS 116 will assemble a message containing authentication information and the context information pulled from data transmitted (8*a*, 8*b*) along with the URL and transmit (10) the message to linkage 122 thru message router 124. If the credentials can not be validated at decision step 420, the session terminates.

At step 426, linkage 122 associates the authentication information with the context established for the dialog session, as discussed with regard to FIGS. 2 and 3. At step 428, future messages from linkage 122 to the back-end computer system 114 or internal IM system 118 will contain the authentication information from the context. This advantageously enables the back-end system 114 or internal IM system 118 to utilize the authentication information for authorizing requests made by the user of PC 117*b* or wireless device 119*b*. WAS 116 can also prompt the user of PC 117*b* and/or wireless device 119*b* to periodically re-authenticate him/herself. For example, if the user begins to withdraw a predetermined sum of money from an account using BCS 114, and a predetermined period of time has elapsed since a previous user response/input, WAS 116 can prompt the user to re-authenticate him/herself to ensure, for example, that another user is not using the account in an unauthorized manner. If at decision step 430 it is determined that no additional messages are transmitted, the session terminates. If additional messages are transmitted, the process returns to step 428.

The elements shown in add-on module 140 illustrate how service module 148 can be transparently inserted into the TCP connection between a client 146 and the service provider system 132. In at least one embodiment, service module 148 can be installed from, for example, a local drive of a PC and/or downloaded from the web. Service module 148 performs functions such as, for example, encrypting at least a portion of the dialog, recording (e.g., storing) at least a portion of the dialog in a non-transitory computer-readable storage medium, such as a permanent store (e.g., a conventional hard disk and/or CD-ROM, as shown in FIG. 5), and/or scanning at least a portion of the dialog for inappropriate content using, for example, natural language techniques.

The IP address of the service provider system 132 is preferably resolved using a DNS server 150 and optional local Domain Name Service (DNS) server 142. The resulting IP address can be recorded in a configuration file 149.

Service module 148 also causes an entry for the service provider system 132 to be made in the conventionally used hosts file 144 of PC 117*b* (or device 119*b*), and records the loopback address (e.g., 127.0.0.1) as the address of the service provider system 132. Hosts file 144 is a conventional text file on PC 117*b* (or wireless device 119*b*) that contains a mapping or association of IP addressees to host names.

When a hosts file 144 is used (e.g., in the C:.backslash-.Windows folder), the PC 117*b* (or wireless device 119*b*) will first check, for example, C:.backslash.Windows for the numerical IP address (e.g., 127.0.0.1) associated with an alphanumeric reference (e.g., www.serviceprovider.com). Unix based systems and wireless devices 119*b* use a hosts file in a similar manner.

Service module 148 receives and accepts incoming connections to the particular ports that the client 146 and service provider system 132 use. When service module 148 is invoked or activated, it first uses the services of the local DNS service 142 and DNS server 150 in a conventional manner to resolve (e.g., map) the alphanumeric name of the service provider system 132 to an IP address. The alphanumeric name of the service provider system 132 is typically pre-configured into the client 146 software provider by the service provider system 132.

The local DNS service 142 accesses the hosts file 144 on PC 117*b* (or wireless device 119*b*) to determine if there is an entry for the service provider system 132 server name (at least one embodiment of service provider system 132 comprises one or more servers). Since the entry for the service provider system 132 server was previously recorded as being the loopback address (i.e., 127.0.0.1) as described above, the loopback address is returned to client 146. Client 146 then opens a TCP connection to the loopback address, and establishes a connection to service module 148. If there is not an alphanumeric reference in the hosts file 144 as typed in a browser, then the local DNS service 142 and DNS server 150 determine the corresponding IP address on the entered alphanumeric reference, preferably in a conventional manner.

In response to the incoming client connection, service module 148, in turn, opens a TCP connection to service provider system 132 server. Service module 148 can determine the IP address of service provider system 132 server in at least two ways. First, service module 148 can instruct local DNS service 142 and DNS server 150 to not consult hosts file 144. Service module 148 then uses DNS server 150 in a conventional manner to execute the DNS protocol to resolve (e.g., map) the alphanumeric name of the service provider system 132 server name to its IP address. Second, service module 148 can read the IP address of the service provider system 132 server from the configuration file created at installation time.

Once a TCP connection to service provider system 132 server is established, dialog protocol traffic from the client 146 is relayed to the service provider system 132 server. Similarly, protocol traffic from the service provider system 132 server is transmitted to the client 146. Service module 148 can optionally modify at least a portion of the dialog protocol traffic, in order to provide add-on services such as, for example, encrypting at least a portion of the dialog, storing at least a portion of the dialog in a non-transitory computer-readable storage medium, such as a permanent store (e.g., a conventional hard drive and/or CD-ROM), and/or scanning at least a portion of the dialog for inappropriate content. Such addon services can be provided by service provider system 132 (e.g., AOL/AIM, MSN, Yahoo! Messenger), or by a third party using add-on module 140.

In addition, once a TCP connection is established between service module 148 and service provider system 132 server, protocol messages can be exchanged between the client 146 and the service provider system 132 server to, for example, establish the identity of the user of the client 146 software, publish the availability of the user for engaging in dialogs, and/or for retrieve the availability of a set of other users (e.g., a Buddy List).

Further, once a user is logged in and user availability is published, the service provider system 132 server can retrieve a list of other users that have announced an interest in the status of the user. If these other users are also connected to the service provider system 132 server, then the status of the newly logged in user is specified to these other users.

If a dialog is established with another user that user a service module 148 (or similar software), then the respective service modules 148 (on each of, for example, PCs 117a, 117b and/or PCs 117b, 117c) can, for example, perform functions such as encrypting/decrypting at least a portion of exchanged dialog traffic, thereby providing a substantially secure communication channel between the two PCs.

Figure 5A:
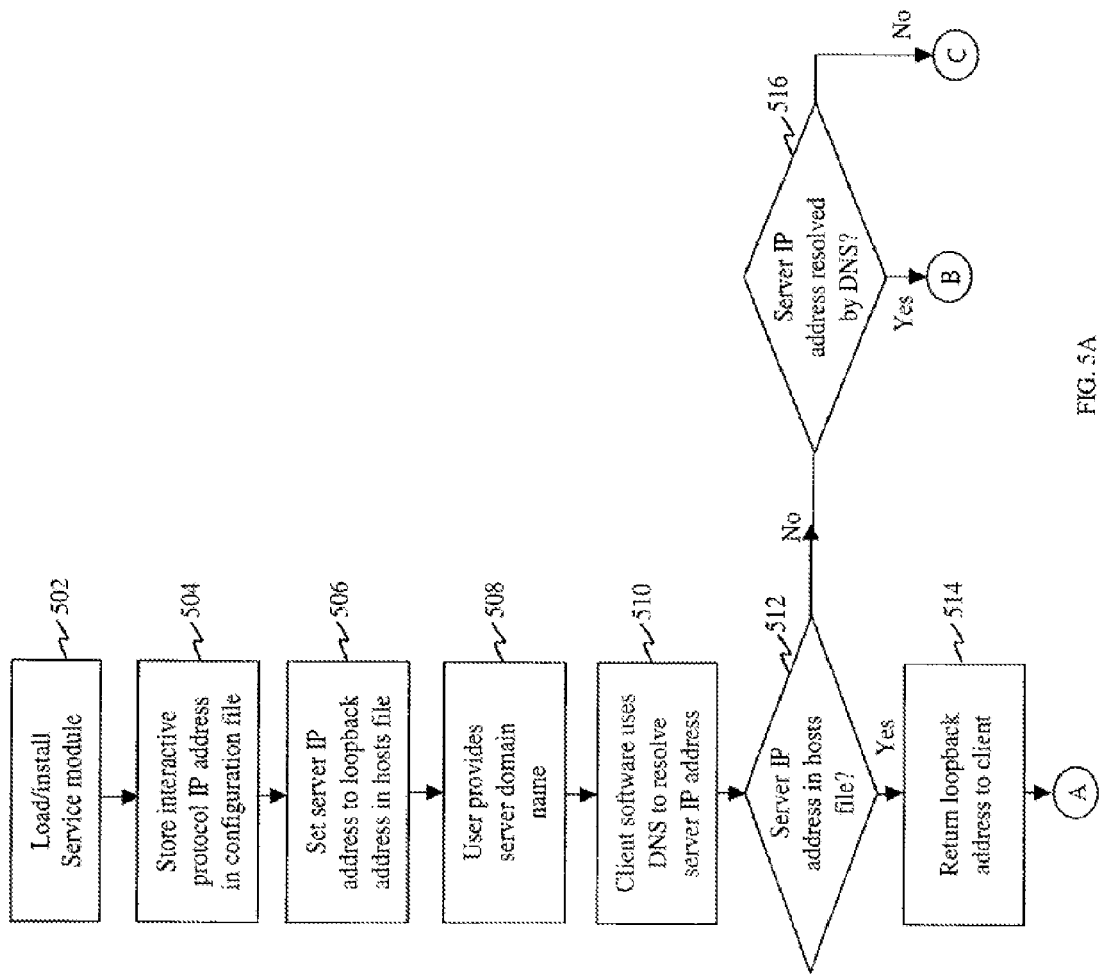
FIGS. 5A and 5B, taken together, is a flowchart of the operation of an embodiment of the add-on services aspect of the present invention.
Figure 5B:
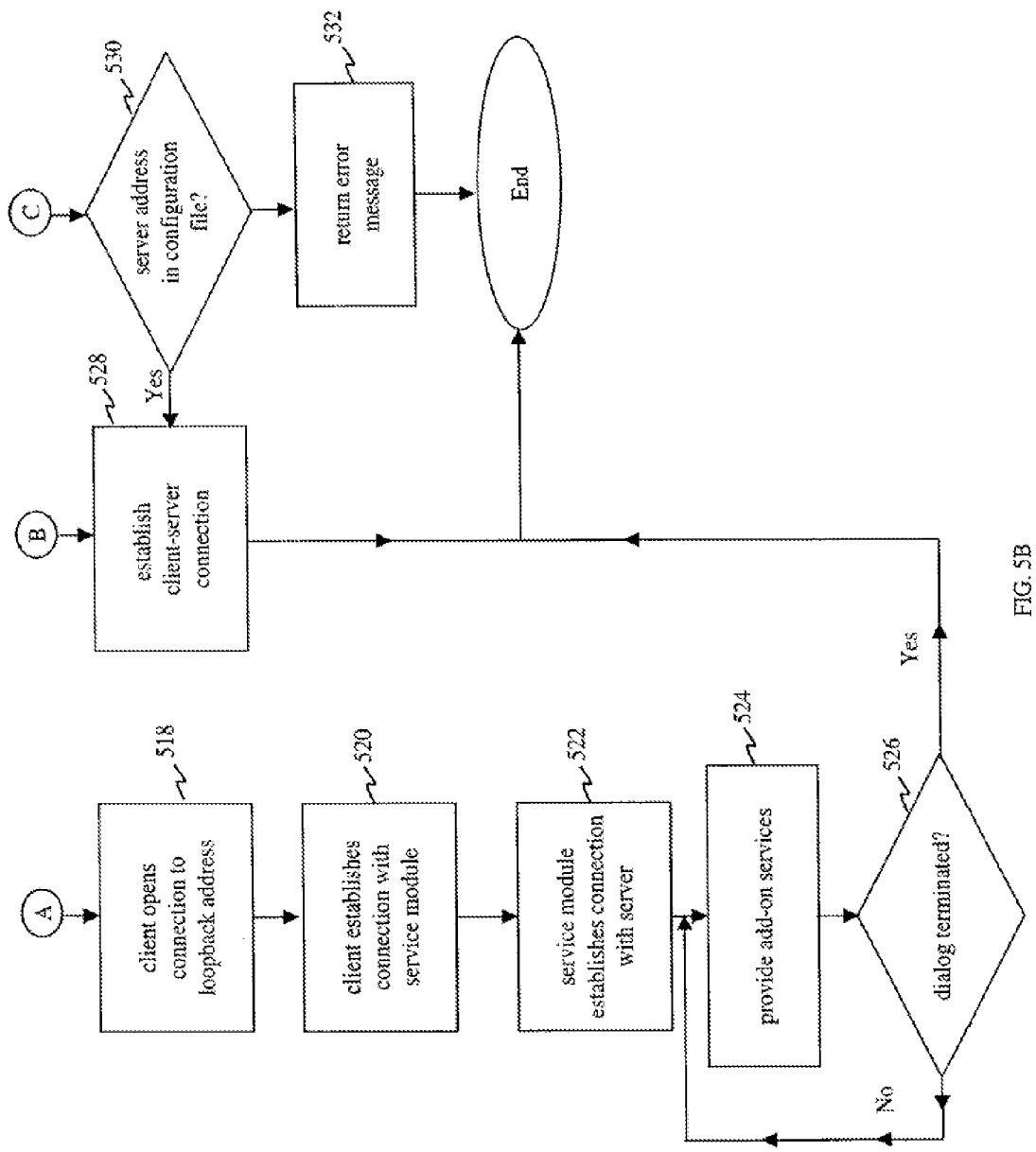

FIGS. 5A and 5B, taken together, is a flowchart of the operation of a preferred embodiment of the add-on services aspect of the present invention. At step 502, service module 148 is installed in a conventional manner. Service module 148 can be installed on a PC 117c by, for example, using a hard drive (not shown) or CD-ROM (not shown) of the PC 117c, and/or by downloading service module 148 using a network connection.

At step 504, the IP address of the service provider system 132 is preferably resolved using, for example, a DNS server 150 and optional local DNS server 142. The resulting service provider system 132 server IP address can be recorded in a configuration file associated with PC 117c. In a preferred embodiment, the name of the service provider system 132 server (e.g., www.serviceprovider.com) is pre-configured into the client 146 software.

At step 506, service module 148 sets the service provider system 132 server IP address to be the loopback address (currently 127.0.0.1), and writes this to hosts file 144. On Windows-based PCs 117c, the hosts file 144 can be located in the C:.backslash.Windows folder. At step 508, a user inserts (e.g., types) the service provider system 132 server name into a conventional web browser.

At decision step 512, service module 148 determines whether the hosts file 144 contains the name of service provider system 132 server, and whether service provider system 132 server has an associated IP address. Since the service provider system 132 server address was set to the loopback address at step 506, a preferred embodiment of service module 148 returns the loopback address to client 146 at step 514.

At step 518, client 146 establishes a TCP connection to the loopback address and, at step 520, further establishes a connection with service module 148. At step 522, service module 522 then establishes a connection with service provider system 132 server.

At step 524, service module 148 mediates between client 146 and service provider system 132 server and provides add-on services such as encrypting at least a portion of the dialog, storing at least a portion of the dialog in a non-transitory computer-readable storage medium, such as a permanent store (e.g., a conventional hard drive and/or CD-ROM), and/or scanning at least a portion of the dialog for inappropriate content.

At decision step 526, a determination is made whether the dialog has been terminated. If the dialog has not been terminated, the dialog continues and additional add-on services can be provided at step 524. If the dialog has been terminated, the process ends.

If at decision step 512, service module 148 determines, for example, that hosts file 144 does not contain the name of service provider system 132 server, and/or service provider system 132 server does not have an associated IP address in hosts file 144, then, at decision step 516, a determination is made whether the IP address of service provider system 132 server has been resolved by DNS server 150, optionally in conjunction with local DNS service 142. It should be understood that although the IP address of service provider system 132 server was set to the loopback address in step 506, the loopback address and/or alphanumeric name of service provider system 132 server may not be accessible in hosts file 144 for a variety of reasons. For example, hosts file 144 may have been corrupted and/or modified since step 506 was last performed, thereby rendering the loopback address associated with service provider system 132 server and/or the alphanumeric name of the service provider system 132 server inaccessible.

If at decision step 516 the local DNS service 142 and/or DNS server 150 resolves the IP address of service provider system 132 server, then at step 528 a client-server connection between client 146 and service provider system 132 server is established. If at decision step 516 the local DNS service 142 and/or DNS server 150 can not resolve the IP address of service provider system 132 server, then, at decision step 530 a determination is made whether the service provider system 132 server resides in a configuration file of PC 117c (or, e.g., wireless device 119a). If service module 148 can obtain the IP address of service provider system 132 server from a configuration file, then a client-server connection between client 146 and service provider system 132 server is established at 528 as discussed above. If at decision step 530 service module 148 determines that the IP address of service provider system 132 server can not be read from a configuration file, then service module 148 returns an error message to, for example, the browser of PC 117c (or, e.g., wireless device 119a).

At step 528, the client server-connection can include such functions as, for example, establishing the identify of the user of the client 146 software, publishing the availability of the user for engaging in dialogs, and/or retrieving the availability of a set of other users (e.g., a Buddy List) that the user may be interested in engaging in a dialog with. In addition, once a user is logged in to the service provider system 132 and announces his status, the server system can retrieve a list of other users that have announced an interest in the status of the user. If the other users are also connected to the service provider system 132 server, then the service provider system 132 preferably provides the status of the newly logged in user to the other users.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. While the foregoing invention has been described in detail by way of illustration and example of preferred embodiments, numerous modifications, substitutions, and alterations are possible without departing from the scope of the invention defined in the following claims.

What is claimed is:

1. In a computer network environment that utilizes at least one dialog based interactive protocol to facilitate communication between a first communication device and at least an interactive protocol service provider, a method of providing add-on services to the interactive protocol, comprising:

setting, on a hosts file of the first communication device, the internet protocol address of a server providing the dialog based interactive protocol service to be a loopback address;

returning the loopback address associated with the dialog based interactive protocol server, stored in the hosts file, to a client operative with the first communication device;

using the client to establish a connection with the loopback address;

establishing communication between the client and an add-on services module operative with the first communication device; and establishing a communication link between the interactive protocol server and the add-on services module.

2. The method according to claim 1, wherein the add-on services module provides at least one of encryption, filtering, and storage of at least a portion of a dialog established between the first communication device and the interactive protocol service provider.

3. The method according to claim 1, wherein the client connection is a transmission control protocol connection.

4. The method according to claim 1, wherein the loopback address is an internet protocol address of 127.0.0.1.

5. The method according to claim 1, wherein the first communication device is at least one of a computer and a wireless device.

6. The method according to claim 1, further comprising:

using at least the interactive protocol service provider to establish a dialog session between the first communication device and a second communication device;

transmitting to the first communication device a link to a site used to facilitate authentication of the first communication device; and associating authentication information with the dialog, thereby enabling the user of the first communication device to engage in authorized communication with the second communication device.

7. The method according to claim 6, wherein the site is secure.

8. The method according to claim 7, wherein the add-on service module provides at least one of encryption, filtering, and storage of at least a portion of the dialog established between the first communication device and the second communication device.

9. The method according to claim 6, wherein said associating authentication information step comprises:

associating a unique identifier with the dialog;

providing user credentials to the site;

receiving at the communication device an authorization token; and using the unique identifier and the authorization token to execute an authorized dialog between the first communication device and the second communication device.

10. The method according to claim 9, wherein the communication devices comprise at least one of a computer and a wireless device.

11. The method according to claim 6, wherein the first communication device uses a first dialog based interactive protocol, and the second communication device uses a second dialog based interactive protocol.

12. The method according to claim 11, wherein the first dialog based interactive protocol and the second dialog based interactive protocol are the same.

13. The method according to claim 11, wherein the first dialog based interactive protocol and the second dialog based interactive protocol are different.

14. A computer program product residing on a non-transitory computer readable storage medium, for use in a computer network environment that utilizes at least one dialog based interactive protocol to facilitate communication between a communication device and at least an interactive protocol service provider, the computer program product comprising instructions for causing a computer to:

set, on a hosts file of a communication device, the internet protocol address of a server providing a dialog based interactive protocol service to be a loopback address;

return the loopback address, stored in the hosts file, associated with the dialog based interactive protocol server, to a client operative with the communication device and associated with the dialog based interactive protocol;

enable the client to open a connection with the loopback address;

establish communication between the client and an add-on services module operative with the communication device; and establish a communication link between the interactive protocol server and the add-on services module.

15. The computer program product according to claim 14, wherein the loopback address is an internet protocol address of 127.0.0.1.

16. A computing device using at least one software module that facilitates the use of at least one dialog based interactive protocol to facilitate communication between a communication device and an interactive protocol service provider, said computing device comprising:

at least one memory area; and at least one processor that uses the at least one software module to (i) set, on a hosts file of the communication device, the internet protocol address of a server providing the dialog based interactive protocol service to be a loopback address, (ii) return the loopback address, stored in the hosts file, associated with the dialog based interactive protocol server, to a client operative with the communication device and associated with the dialog based interactive protocol, (iii) use the client to open a connection with the loopback address, (iv) establish communication between the client and an add-on service module operative with the communication device, and (v) establish a communication link between the interactive protocol sever and the add-on services module.

17. The computing device according to claim 16, wherein said at least one processor further uses the at least one software module to provide at least one of encryption, filtering, and storage of at least a portion of a dialog established between the communication device and the interactive protocol service provider.

18. The computing device according to claim 16, wherein the loopback address is 127.0.0.1.

* * * * *